April 19, 1927. 1,625,659
P. P. HENSHALL
MOTOR BOARD SUSPENSION
Filed Feb. 25, 1925
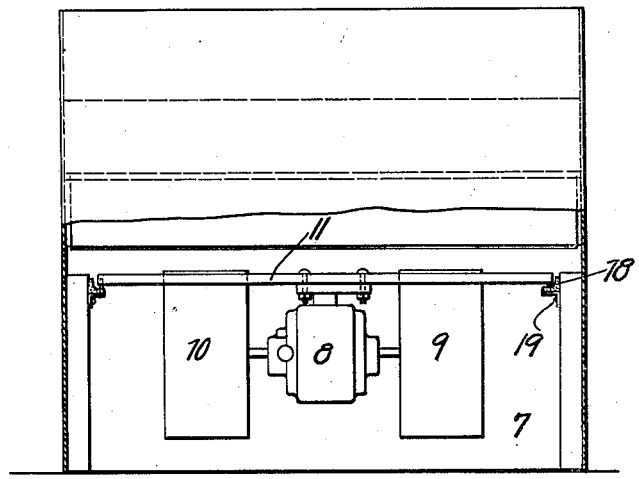
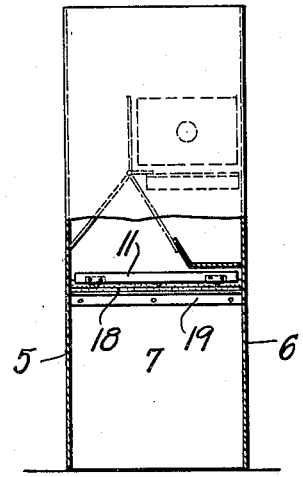
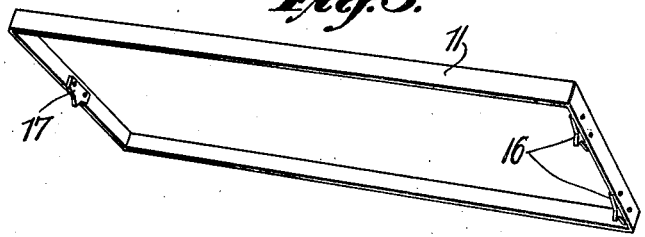
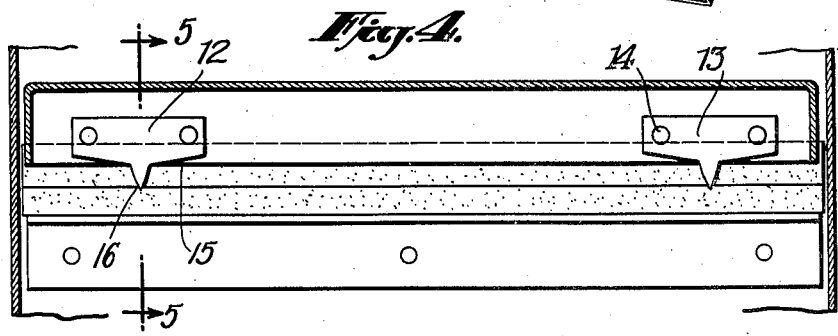
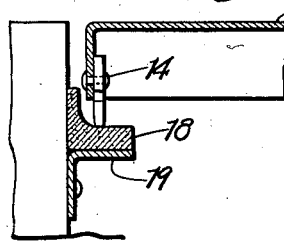
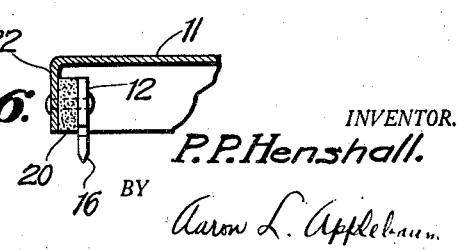
INVENTOR.
P. P. Henshall.
BY
Aaron L. Applebaum
ATTORNEY.

Patented Apr. 19, 1927.

1,625,659

UNITED STATES PATENT OFFICE.

PERCIVAL P. HENSHALL, OF ATLANTIC CITY, NEW JERSEY, ASSIGNOR TO JOHN J. NESBITT, INC., OF ATLANTIC CITY, NEW JERSEY, A CORPORATION OF NEW JERSEY.

MOTOR-BOARD SUSPENSION.

Application filed February 25, 1925. Serial No. 11,618.

This invention relates to heating and ventilating units and more particularly to a novel and improved motor and fan assembly support for eliminating electrical noises and vibrations.

One of the objects of my invention is to provide a three point motor board suspension for heating and ventilating units whereby the motor board may be supported in spaced relation to the cabinet of the heating and ventilating unit so that the motor vibrations and incident noises may be eliminated or reduced to a minimum.

A further object of my invention is to support the motor board within the cabinet of a heating and ventilating unit preferably at three points so that when it is set, the ends of the motor board will not tilt, including further provision for absorbing the vibrations and noises of the motor and fans which otherwise are communicated from the motor board to the cabinet of the heating and ventilating unit.

Another object of my invention is to provide a three point suspension for the motor board of the heating and ventilating unit wherein said motor board is preferably supported at its ends in spaced relation to the walls of the heating and ventilating unit, said suspension means being imbedded or in contact with a vibration absorbing surface such as a strip of lead or its equivalent.

In order to more fully understand and appreciate my invention, reference is had to the accompanying drawings, showing a preferred embodiment thereof, wherein;

Figure 1 is a front view showing the interior of the heating and ventilating unit and the motor board supported therein.

Figure 2 is an end view of the cabinet and motor board as shown in Figure 1.

Figure 3 is a perspective view of the motor board showing the three point support or suspension means.

Figure 4 is an enlarged end, sectional view showing the motor board supported on the vibration absorbing surface.

Figure 5 is a sectional view taken substantially on the line 5—5 of Figure 4.

Figure 6 is a slightly modified form of a suspension supporting plate and an interposed vibration absorbing pad secured thereto.

Referring now to the drawings, wherein like reference characters designate corresponding parts throughout all the views, 5 designates the front wall, 6 the rear wall and 7 the blower chamber of a heating and ventilating unit embodying my invention. In the upper portion of the ventilating unit there is provided a heater and a heating chamber, a by-pass chamber and a hinged damper for controlling the passage of air from the blower chamber to either the heating or by-pass chambers above referred to. The motor 8, fan housings and fans 9, 10, are usually supported or suspended from a motor board which I have designated in its entirety by numeral 11.

It has been the practice to support the motor board at some point on the end walls of the cabinet, said cabinet being usually of metal. The vibrations and noises set up by the motor, motor shaft and fans being communicated to the motor board and to the cabinet proper, have always been a source of annoyance and very objectionable, particularly when alternating current motors are employed. Furthermore, if the weight of the motor and fan housings is not properly centered, the motor board, when set in the cabinet, has the tendency to tilt at one end.

In order to overcome these objections, I have provided the motor board 11 with a three point suspension consisting of the end plates 12, 13, preferably spot welded or riveted as at 14 to the end of said board, which is usually of metal. Each plate 12 is cut inwardly as at 15 toward the center and concludes in a projection or extension 16, which is located intermediate the ends of the plate. The end plate 17 at the opposite end of the motor board is similarly constructed being located between the plates 12, 13. In this manner, the three point suspension tends to stabilize and balance the weight carried by the motor board.

In order to eliminate and minimize any vibrations or noises communicated to the motor board by the motor and fans, the motor board is supported in spaced relation from the walls of the cabinet by the plates at the respective ends thereof, the projections or extensions 16 of said plates being in engagement with a vibration absorbing surface such as lead liner strips 18, which are supported on angle bars or brackets 19 riveted or secured to the cabinet of the ventilating unit. The projections 16 of the plates 12 thus become imbedded in the metal of the lead liner.

It is a well known fact that the vibrations caused by a motor follow the same characteristics as a simple harmonic motion produced by a tuning fork, and follow a line drawn graphically, which compares very favorably to the sine curve. In order to have any sound whatsover from a vibrating object, we have two forces acting; first, the force which sets up motion in the object, and second, the force which returns the vibrating object to equilibrium position, or the force of restitution. In order to reproduce the sound wave created in one object through a medium to another object in the same proportion and same magnitude as it was originally created, the object through which the waves are being transmitted must have the force of restitution equal to the force of displacement. It is a well known fact that lead is a dead metal without the characteristics of any of the other metals having "spring". It will be noted that the motor board is thus held in spaced relation from the cabinet proper and the only points of contact of the plates are at the sharpened projections 16.

There are thousands upon thousands of electrical vibrations being set up in the electric motor at every revolution. Under ordinary circumstances, the vibrations are communicated through the motor board in all directions. When they reach the three point suspension plates and try to escape, the vibrations are dammed back or escape through the points of contact, but for the most part enter the air space with the result that the escaping vibrations are perceptible to the ear. While theoretically no vibrations escape, actually of course, the points of contact must have some area of cross section, with the result that very few of the vibrations do pass and are communicated to the dead metal or the lead liner above described. The vibrations thus communicated are thus reduced to a minimum and are practically entirely absorbed.

If so desired, and as shown by Figure 6, a vibration absorbing substance 20 such as felt, fibre or their equivalent may be interposed between the plate 12 and the end wall 22, for instance, of the motor board. This, of course, will further tend to eliminate the vibrations communicated or conducted to the plate 12 and any vibrations that may be set up in said plate will be eliminated or reduced to a minimum through the projection in contact with the dead metal or surface.

Having thus shown and described my invention, what I claim as new and desire to secure by United States Letters Patent is:—

A vibration absorbing support for cabinets comprising a motor board, plates attached to the ends of said board for supporting it at three points, said plates having bottom projections of small cross sectional area and lead strips carried by the cabinet, said projections and strips being in contact whereby the vibrations set up in the board by a motor and fan assembly in suspension therefrom may pass only through said points of contact.

In testimony whereof I affix my signature.

PERCIVAL P. HENSHALL.